Nov. 15, 1938.　　　H. J. DE N. McCOLLUM　　　2,136,800
CLUTCH CONTROL MECHANISM
Filed Oct. 11, 1935
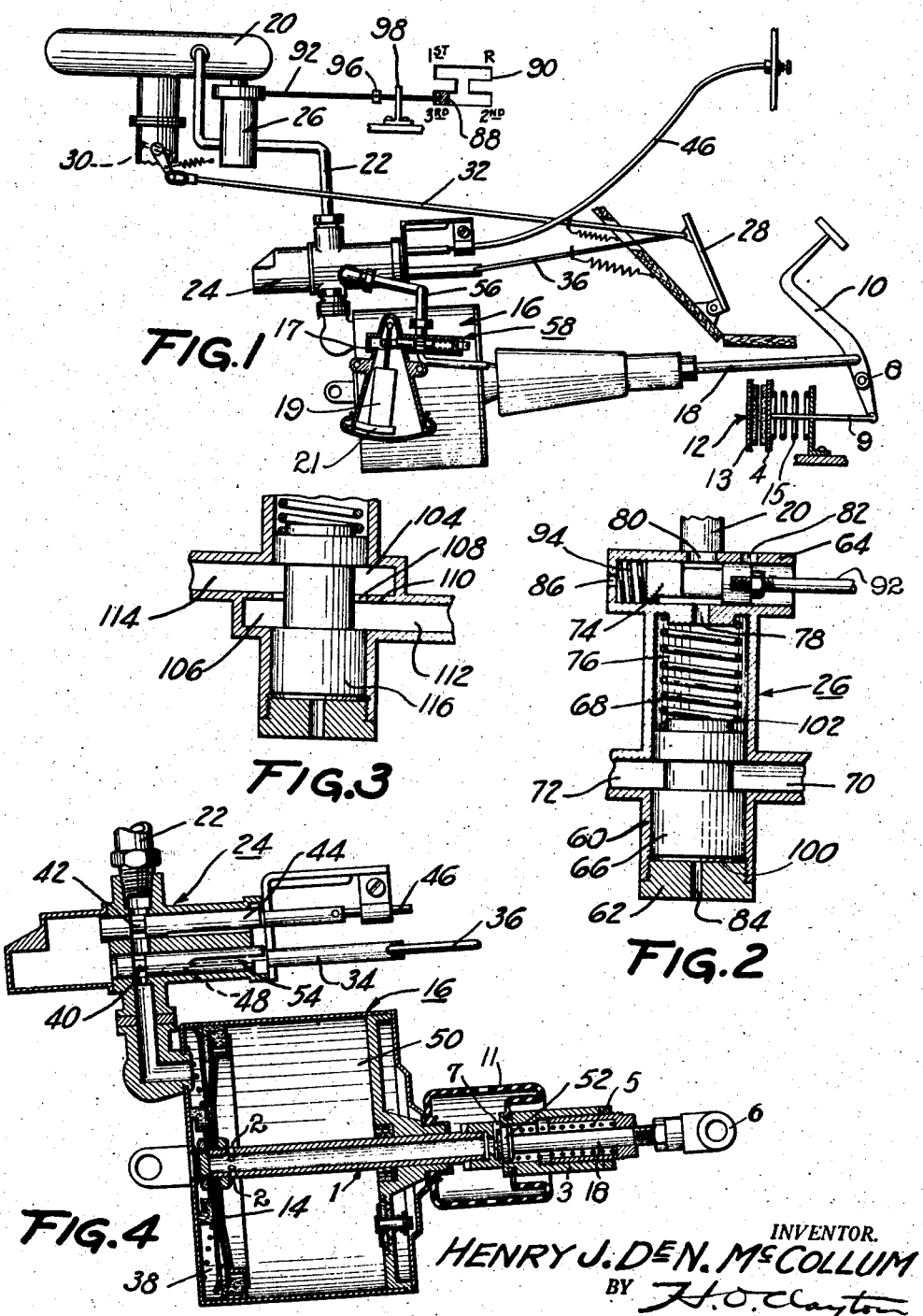
INVENTOR.
HENRY J. DE N. McCOLLUM
BY H. O. Clayton
ATTORNEY Patented Nov. 15, 1938

2,136,800

UNITED STATES PATENT OFFICE 2,136,800

CLUTCH CONTROL MECHANISM

Henry J. De N. McCollum, Evanston, Ill.

Application October 11, 1935, Serial No. 44,522

14 Claims. (Cl. 192—.01)

This invention relates to power means for operating the clutch of an automotive vehicle.

The development of this art has, in large measures, been based upon a type of accelerator controlled vacuum clutch actuator in which the clutch is automatically disengaged whenever the accelerator is released, thus causing unnecessary wear of the clutch throw-out bearing and also effecting a free-wheeling action of the vehicle. This latter action would be particularly objectionable when it is desired to employ the engine as a brake, the transmission at that time usually being in high gear.

The present invention is therefore directed to means for cutting out of operation the clutch operating power means, when and if the transmission is in high gear and the engine is not being employed as a brake.

A further object of the invention is to provide, in an accelerator controlled vacuum clutch operator, a power operated cut-out valve controlled in part by a gear shift lever operated three-way valve.

Yet another object of the invention is to provide a manifold vacuum operated cut-out valve for a clutch operator, said valve being operable as such, when and if the manifold vacuum is maintained at or above a predetermined factor.

Yet another object is to provide, in a manifold vacuum operated automatic clutch mechanism, means for cutting out of operation said mechanism when the gear shift lever is moved to its high gear position and the degree of intake manifold vacuum is above that normally effected by an idling engine.

Other objects of the invention and desirable details of construction and combinations of parts will become apparent from a detailed description of certain embodiments of the invention, described in detail in the following specification taken in conjunction with the accompanying drawing illustrating said embodiments, in which:

Figure 1 is a diagrammatic view of the clutch control mechanism constituting my invention;

Figure 2 is a sectional view of the cut-off valve unit of the mechanism of Figure 1;

Figure 3 is a sectional view of a modified form of cut-off valve unit; and

Figure 4 is a sectional view of the clutch servo motor and attached control valve unit of the mechanism of Figure 1.

Referring to Figure 1, disclosing a preferred embodiment of my invention, a conventional clutch pedal 10 connected to a conventional disc clutch generally indicated at 12 is in part operatively connected to a piston 14 of a manifold vacuum operated pressure differential servo motor 16 by a connecting rod 18. The servo motor 16 is placed in fluid transmitting connection with an intake manifold 20 by a conduit 22, a combined three-way and cut-out valvular unit 24 being incorporated in said conduit. A transmission and manifold vacuum controlled power operated cut-out valve unit 26, constituting the essence of my invention, is also incorporated in said conduit.

The clutch servo motor 16 and control valve unit 24, disclosed in detail in Figure 4, constitute no part of my invention, the same being that of Victor W. Kliesrath, disclosed, described and claimed in his application No. 721,683, filed April 21, 1934.

Referring to the operation of said mechanism for a more detailed description thereof; upon release of an accelerator 28, operatively connected to a throttle 30 by a link 32 and to a combined three-way and bleed valve plunger 34 of the valve unit 24 by a link 36, the manifold 20 is placed in communication with the vacuum compartment 38 of the servo motor 16 via the conduit 22 and waist portions 40 and 42 of plunger 34 and a cut-out valve plunger 44 respectively. The cut-out valve is operable by a Bowden control 46. The compartment 38 is thereupon evacuated to effect a movement of the piston 14 to the clutch disengaged position shown in Figure 4.

To reengage the clutch the operator depresses the accelerator 28 to first move the valve plunger 34 to the left, Figure 4, to first cut off communication between the compartment 38 and the manifold and then vent said compartment to the atmosphere via a slot 48 in the plunger. The engagement of the clutch under the action of its springs is thus initiated, said engagement being controlled by controlling the egress of air from the high pressure compartment 50 of the clutch servo motor. The air first rushes from said latter compartment relatively rapidly, to effect a rapid movement of the clutch pedal, via the conduit in hollow piston rod 1 which is controlled by a valve mechanism 52, said mechanism being more completely described, disclosed and claimed in an application of Caleb S. Bragg, Serial No. 643,499, filed November 19, 1932.

By way of brief description for purposes of this case it may be stated that the hollow piston rod 1 set in piston 14 has a port 2, connecting its interior with the cylinder space 50 in front of said piston; and also has a sleve 3 fast on its outer end, which sleeve serves as a casing for a poppet valve 52 which is normally held against the open end of said hollow piston rod by a compression spring 5, anchored in the outer end of said sleeve, thus serving to close all exit for air from said piston rod interior so long as said spring is expanded. The stem 18 of said valve projects beyond the outer end of sleeve 3 and is provided with a clevis 6 for connection to any clutch pedal such as that indicated at 10 in Fig. 1. The sleeve 3 has an outlet port 7 in its wall near the end to which the hollow piston rod 1 is connected. The clutch generally and diagrammatically indicated at 12 in Fig. 1 is of any conventional construction, the clutch lever 10 being pivoted at 8, and composed of the usual two revoluble plates indicated at 13 and 4, normally forced together by a spring indicated at 15. One plate, as 13 is as usual fast on the shaft of the car engine (not shown) while the other (4) revolves with the transmission shaft (also not shown), all in the manner well known in the automotive art. Plate 4 is pulled away from 13 by link 9 when pedal on lever 10 is depressed. 11 is a flexible boot on piston rod 1.

When the clutch plates just contact, the valve 52 automatically closes and the remainder of the clutch engagement is controlled by a bleed valve mechanism comprising a tapered slot 54 in the plunger 34, the air being led to said slot via a conduit 56. An inertia operated cut-off valve mechanism indicated generally at 58, the same having the construction shown in application Serial No. 622,513, filed July 14, 1932 by Harold W. Price, is incorporated in said bleed conduit to automatically and momentarily stop the bleed of air from the compartment 50, should the acceleration of the vehicle exceed a predetermined maximum.

This inertia-actuated valve mechanism indicated generally by 58 is of the type also shown and broadly claimed in my copending application Ser. No. 645,676, filed December 3, 1932, passage through the conduit 56 being controlled by sliding piston valve 17 which is shut when pendulum 19 swings backward (toward the right) as the car is suddenly started into movement (as by sudden closing of clutch 12 while the engine is running fast), or is similarly sharply accelerated (as in stepping up gearing). The stop 21 is fastened to the lower end of the pendulum prevents it swinging forward and closing conduit 56 when the forward motion of the car is checked.

Operation of the described system of automatic valves shown may be briefly outlined as follows: Spring 5 presses on valve 52 with less force than that exerted by the pull of clutch lever 10 on valve stem 18. Consequently, when piston 14 is retracted by vacuum action ports 2 and 7 are connected, and as the clutch lever pulls piston 14 to the right when the vacuum behind the latter is reduced the air in space 50 is pushed out through the hollow piston 1, issuing as a jet through port 7. When, however, the clutch plates 13 and 4 make contact the movement of valve 52 is retarded, and also that of piston 14, so that the resistance to motion of the piston presented by air trapped in space 50 and flowing out through port 7 is gradually reduced as the speed of the issuing jet is reduced, so that spring 5 can expand and pull the end of hollow piston rod 1 against valve 52. Thereafter the air must escape through accelerator-controlled valvular unit 24 and inertia controlled valve 58, which severally operate as previously explained.

The mechanism of Figure 4 thus functions, upon release of the accelerator, to disengage the clutch, and upon depression thereof to effect a controlled two-stage engagement thereof, the clutch being automatically slipped by the inertia or pendulum operated valve 58, should the engagement be so severe as to jerk the vehicle.

My invention is directed to means supplementing the above-described clutch control invention, the object of the invention being to provide a cut-out valve operable to render the clutch control mechanism inoperative, when and if the transmission is in high gear and the vehicle is overrunning the engine.

To this end there is provided a power operated cut-out valve mechanism, disclosed in detail in Figure 2. Said mechanism comprises a hollow cylindrical casing 60 closed at one end by a plug 62 and at its other end by a tubular three-way valve casing 64. A spool-shaped valve plunger member 66 is reciprocably mounted within the casing 60, the same being normally positioned by a spring 68, as disclosed in Figure 2, to interconnect a port 70 connected through one portion of conduit 22 to the aforementioned valve unit 24 with a port 72 connected through the other portion of said conduit to the manifold 20.

A spool-shaped valve plunger member 74 is slidably mounted within the casing 64 and, together with said casing, constitutes a three-way valve, alternately interconnecting a compartment 76 above the said valve plunger member 66 with the manifold 20 via ports 78 and 80, or connecting said compartment with the atmosphere via ports 78 and 82. Vents 84 and 86 in the plug 62 and casing 64 respectively permit unrestricted movement of the plungers 66 and 74.

Valve plunger 74 is held in a position to interconnect the manifold and compartment 76 by the gear shift lever of the vehicle, shown in cross section at 88 in Fig. 1, the latter being selectively movable within the conventional H-shaped slot 90 of the transmission mechanism. When the shift lever is in its high gear position, as disclosed in Figure 1, the member 88 contacts a link 92 secured to the plunger 74, moving the latter to the above-described position, shown in solid lines in Figure 2.

In all other positions of the gear shift lever, that is when the same is in its low, second or reverse gear positions or in neutral, a valve spring 94 within the casing 64 functions to move the plunger 74 to the right of the position disclosed in Figure 2 to vent the compartment 76 to atmosphere, via the port 82 in the casing. A stop member 96 fast on the link 92 abuts a fixed stop 98 to limit the position of the plunger 74.

Describing now the operation of the cut-out valve mechanism, when the transmission is in high gear, the plunger 74 is moved to connect the manifold with the compartment 76. Should the driver then, either inadvertently or by design, release the accelerator, the valve plunger 66 is forthwith moved upwardly to cut off communication between ports 70 and 72, that is communication between the manifold and the clutch motor and thus prevent a power operation of the clutch. This operation is effected by virtue of the difference in gaseous pressures acting upon the ends of plunger 66, the pressure of the atmosphere acting on the lower end 100 thereof and the gaseous pressure of the manifold acting upon its upper end 102. The two ends 100 and 102 thus constitute means operated by power to operate the cut-off valve constituted by the central portion of the plunger. It is also to be noted that the parts are so constructed and proportioned that the cut-off valve closes before the compartment 38 of the clutch motor is sufficiently evacuated to impart any movement to the clutch pedal.

It follows from the above that the clutch remains engaged, when the transmission is in high gear, thus utilizing the engine as a brake and obviating unnecessary wear on the clutch throwout bearing. It is desirable, however, to automatically disengage the clutch when the speed of the vehicle is appreciably reduced, thereby obviating stalling of the engine. To this end the spring 68 is so proportioned with reference to the length of compartment 76 in which it is to be located as to automatically move the plunger 66 downwardly, when and if the manifold vacuum is decreased to or below a predetermined factor.

When the vehicle is overrunning the engine, the latter then acting as a brake, the manifold vacuum developed is considerably higher than that developed solely by an idling engine. Accordingly, when the engine is no longer acting as a brake, that is when the speed of the vehicle is appreciably reduced and the manifold vacuum has been reduced to a predetermined minimum, the cut-off valve is automatically operable to reconnect the manifold with the clutch motor to disengage the clutch.

There is disclosed in Figure 3 a modified form of cut-off valve mechanism similar in all respects to that of Figure 2, with the exception of the provision of two compartments 104 and 106 interconnected by a port 108 in a dividing wall 110. A conduit 112 leading to the clutch controlling power unit is connected with compartment 104 and a conduit 114 leading to the manifold is connected to the compartment 106. With such a construction the lower portion 116 of the valve is, when in its raised, vacuum cutting off position, subjected to the low gaseous pressure of the manifold upon an annular area of its surface concentric with its axis. The tendency of the plunger to cock or bind, as with the plunger 66 of Figure 2, is thus obviated. Furthermore, the absence of any excess of air pressure on any one side of the valve shown in Fig. 3 as it moves toward or from closed position, such as is present in the modification shown in Fig. 2, eliminates nearly all friction and consequent wear of the surfaces of valve and casing such as occur when the latter form is used. Such uneven wear would in time distort the cross sections of both valve and casing in Fig. 2 from their originally true circular outline and so destroy the initial close fit of the valve in its casing,—which must be preserved if leakage is to be prevented.

Also, the valve in Fig. 3, while closing, moves in the direction of the current of air flowing around it from chamber 106 through opening 108 to the intake manifold. Such rapid air current would (particularly during the latter half of the valve's closing movement) exert considerable skin friction on the peripheral surfaces of the valve and impinge sharply on the lower side of its upper head, and as the drag so produced would be in the direction of said closing movement it would accelerate and facilitate it.

These advantages developed by the modification shown in Fig. 3 are similar to many inherent in an ordinary poppet valve construction (though it is not strictly of that type) and sharply distinguish both from an ordinary slide valve of piston or other form (such as shown in Fig. 2) in which unbalanced pressures and rapid current flow create side thrusts on the valve body, with the result that the consequent increased frictional drag of the valve against its casing tends to retard its closed motion,—as well as to result in leakage produced by wear of the parts, as hereinbefore explained.

There is thus provided a simple and effective power operated cut-off valve for an automatic clutch control mechanism, said mechanism being rendered inoperative by said valve only when and if the transmission is in high gear and the vehicle is overrunning the engine sufficiently to create a manifold vacuum higher than that of an idling engine.

Although this invention has been described in connection with certain specific embodiments, the principles involved are susceptible of numerous other applications that will readily occur to persons skilled in the art. The invention is, therefore, to be limited only as indicated by the scope of the appended claims.

I claim:

1. In a clutch operating mechanism including an accelerator controlled pressure differential operated motor operably connected with the clutch, a cut-out valve for said mechanism, and power means for operating said valve, said power means including vacuum operated means controlled in part by the transmission operating mechanism of the vehicle.

2. In a clutch operating mechanism including an accelerator controlled pressure differential operated motor operably connected with the clutch, a cut-out valve for said mechanism, and power means for operating said valve, said power means including vacuum operated means controlled in part by the transmission operating mechanism of the vehicle and in part by a spring of predetermined tension.

3. In a clutch operating mechanism including an accelerator controlled pressure differential operated motor operably connected with the clutch, a fluid pressure power operated cut-out valve for said mechanism, and means for controlling said valve including the gear shift lever of the transmission.

4. In a clutch operating mechanism including an accelerator controlled pressure differential operated motor operably connected with the clutch, a cut-out valve for said mechanism, and means to operate said valve including pressure differential operated means, and means to control said latter means including a gear shift lever operated three-way valve.

5. In an automotive vehicle provided with a clutch, an engine having an intake manifold, and a transmission, power means for operating the clutch comprising a pressure differential operated motor, and valve means for controlling said motor including a cut-out valve operated by said transmission and manifold vacuum.

6. In an automotive vehicle provided with a clutch, an engine having an intake manifold and a transmission, power means for operating the clutch comprising a pressure differential operated motor, and valve means for controlling said motor including a power operated cut-off valve operable when and if the transmission is in high gear and the gaseous pressure of the manifold is at or above a predetermined factor.

7. In an automotive vehicle provided with a clutch, an engine having an intake manifold and a transmission, power means for operating the clutch comprising a pressure differential operated motor, and valve means for controlling said motor including a pressure differential operated cut-out valve and transmission operated means for controlling said valve.

8. In an automotive vehicle provided with a clutch, an intake manifold and a transmission operating gear shift lever, power means for operating said clutch, and means for cutting out of operation said power means, said cut-out means including a power operated valve controlled in part by said shift lever and in part by the degree of vacuum within said manifold.

9. In an automotive vehicle provided with a clutch and an intake manifold, power means for operating said clutch comprising a pressure differential operated motor operably connected with the clutch, a fluid transmitting connection interconnecting said manifold and motor, a motor controlling three-way valve interposed in said connection, and a manifold vacuum response power operated cut-out valve also interposed in said connection between said manifold and three-way valve.

10. In an automatic clutch-actuating apparatus comprising a vacuum-actuated servo-motor, and a conduit for connecting it to the intake manifold of a motor car, the combination, with said elements, of a valve controlling passage through said conduit adapted to be closed by the suction from said manifold, and means adapted to effect an opening of said valve only when the speed changing gears of a car in which said apparatus is installed are in a position of low, or intermediate, speed adjustment; whereby, when said gears are in high speed adjustment, said conduit valve is closed and said servomotor is cut off from connection with said manifold, being thereby temporarily rendered inoperative, and said clutch actuating apparatus is cut out of action.

11. A vacuum actuated apparatus for opening and closing a friction clutch comprising a servo-motor which is adapted to be operatively connected to the movable member of such a clutch and has a vacuum space in its interior with a conduit extending therefrom adapted to be connected to a vacuum creating device, combined with a valve which normally completely closes all connection between said servomotor vacuum space and said conduit so long as any substantial degree of vacuum exists in the latter, and manually controllable means for causing said valve to open said connection independently of such vacuum condition.

12. In an automatic clutch-actuating apparatus comprising a vacuum-actuated servo-motor, and a conduit for connecting it to the intake manifold of a motor car, the combination, with said elements, of a valve adapted to completely close all connection between said servo-motor vacuum space and said intake manifold so arranged that any suction existing in the latter tends to hold the valve in such closed position, and means adapted to effect an opening of said valve only when the speed changing gears of a car in which said apparatus is installed are in a position of low, or intermediate, speed adjustment; whereby, when said gears are in high speed adjustment, said conduit valve is closed and said servo-motor is cut off from connection with said manifold, being thereby temporarily rendered inoperative, and said clutch actuating apparatus is cut out of action.

13. A vacuum-actuated apparatus for opening and closing a friction clutch comprising a servo-motor which is adapted to be operatively connected to the movable member of such a clutch and has a vacuum space in its interior with a conduit extending therefrom adapted to be connected to a vacuum creating device, combined with a valve adapted to completely close said connection between said servo-motor vacuum space and said vacuum creating device so arranged that any suction existing in the latter tends to hold it in such closed position, and manually controllable means for causing said valve to open said connection independently of such vacuum condition.

14. In an automatic clutch-actuating apparatus comprising a vacuum-actuated servo-motor, and a conduit for connecting it to the intake manifold of a motor car, the combination, with said elements, of a valve adapted to completely close all connection between said servo-motor vacuum space and said intake manifold (when moved in the direction of the flow of air through said conduit), and so arranged that any suction existing in the manifold tends to hold the valve in such closed position, and means adapted to effect an opening of said valve only when the speed changing gears of a car in which said apparatus is installed are in a position of low, or intermediate, speed adjustment; whereby, when said gears are in high speed adjustment, said conduit valve is closed and said servo-motor is cut off from connection with said manifold, being thereby temporarily rendered inoperative, and said clutch actuating apparatus is cut out of action.

HENRY J. De N. McCOLLUM.

CERTIFICATE OF CORRECTION.

Patent No. 2,136,800.   November 15, 1938.

HENRY J. DE N. McCOLLUM.

It is hereby certified that error appears in the printed specification of the above numbered patent requiring correction as follows: Page 1, second column, line 54, for "sleve" read sleeve; page 2, first column, line 50, strike out the word "is"; line 70, for "isuing" read issuing; page 3, second column, line 6, for "closed" read closing; page 4, first column, line 21, claim 9, for "response" read responsive; and that the said Letters Patent should be read with this correction therein that the same may conform to the record of the case in the Patent Office.

Signed and sealed this 30th day of January, A. D. 1940.

(Seal)

Henry Van Arsdale,
Acting Commissioner of Patents.